(12) United States Patent
Huang et al.

(10) Patent No.: US 10,750,571 B2
(45) Date of Patent: *Aug. 18, 2020

(54) SPATIAL REUSE SIGNALING IN THE PHYSICAL LAYER CONVERGENCE PROCEDURE (PLCP) SERVICE DATA UNITS (PSDUS)

(71) Applicant: Intel IP Corporation, Santa Clara, CA (US)

(72) Inventors: Po-Kai Huang, San Jose, CA (US); Laurent Cariou, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,208

(22) Filed: Dec. 12, 2018

(65) Prior Publication Data
US 2019/0239278 A1    Aug. 1, 2019

Related U.S. Application Data

(63) Continuation of application No. 15/382,128, filed on Dec. 16, 2016, now Pat. No. 10,201,037.
(Continued)

(51) Int. Cl.
*H04W 80/02* (2009.01)
*H04B 7/0452* (2017.01)
*H04W 84/12* (2009.01)

(52) U.S. Cl.
CPC .......... *H04W 80/02* (2013.01); *H04B 7/0452* (2013.01); *H04W 84/12* (2013.01)

(58) Field of Classification Search
CPC ..... H04W 80/02; H04W 84/12; H04B 7/0452
(Continued)

(56) References Cited

U.S. PATENT DOCUMENTS 10,201,037 B2    2/2019 Huang et al.
2015/0110093 A1  4/2015 Asterjadhi et al.
(Continued)

OTHER PUBLICATIONS

U.S. Appl. No. 15/382,128, now U.S. Pat. No. 10,201,037, filed Dec. 16, 2016, Spatial Reuse Signaling in the Physical Layer Convergence Procedure (PLCP) Service Data Units (PSDUS).
(Continued)

*Primary Examiner* — Obaidul Huq
(74) *Attorney, Agent, or Firm* — Schwegman Lundberg & Woessner, P.A.

(57) ABSTRACT

Embodiments for an access point (AP), station (STA) and method for communication are generally described herein. An access point (AP), configurable to operate in a basic service set (BSS), the apparatus comprising memory. The AP further comprising processing circuitry coupled to the memory. The processing circuitry configured to encode a physical layer convergence procedure (PLCP) protocol data unit (PPDU) for transmission to stations operable in the BSS. The PPDU may comprise a media access control (MAC) header portion. The processing circuitry may encode signaling in the MAC header portion of the PPDU that defines a spatial reuse restriction and the spatial reuse restriction may restrict spatial reuse by stations operating in a BSS that is different from the BSS of the AP. In an embodiment, processing circuitry coupled to the memory may encode the spatial reuse restriction in an HE-A control field of the MAC header portion.

20 Claims, 11 Drawing Sheets

Related U.S. Application Data

(60) Provisional application No. 62/291,697, filed on Feb. 5, 2016.

(58) Field of Classification Search
USPC .......................................... 370/310, 328, 329
See application file for complete search history.

(56) References Cited

U.S. PATENT DOCUMENTS

| | | | |
|---|---|---|---|
| 2016/0135225 A1* | 5/2016 | Kwon | H04W 74/085 370/329 |
| 2017/0118725 A1 | 4/2017 | Chu et al. | |
| 2017/0127448 A1 | 5/2017 | Zhou et al. | |
| 2017/0230837 A1 | 8/2017 | Huang et al. | |

OTHER PUBLICATIONS

"U.S. Appl. No. 15/382,128, Examiner Interview Summary dated Jul. 16, 2018", 2 pgs.

"U.S. Appl. No. 15/382,128, Non Final Office Action dated Apr. 6, 2018", 27 pgs.

"U.S. Appl. No. 15/382,128, Notice of Allowance dated Sep. 25, 2018", 9 pgs.

"U.S. Appl. No. 15/382,128, PTO Response to Rule 312 Communication dated Dec. 14, 2018", 2 pgs.

"U.S. Appl. No. 15/382,128, Response filed Jul. 6, 2018 to Non Final Office Action dated Apr. 6, 2018", 10 pgs.

\* cited by examiner

/ 1200

HT Control field / 1205

| Variant | Bit 0 (value) | Bit 1 (value) | Bit 2-29 | Bit 30 | Bit 31 |
|---|---|---|---|---|---|
| HT variant | VHT (0) | HT Control Middle | | AC Constraint | RDG/More PPDU |
| VHT variant | VHT (1) | HE (0) | VHT Control Middle | AC Constraint | RDG/More PPDU |
| HE variant | VHT(1) | HE (1) | Aggregated Control | | |

1210
1215
1220

A-Control subfield of the HE variant HT Control field
1305

SPATIAL REUSE SIGNALING IN THE PHYSICAL LAYER CONVERGENCE PROCEDURE (PLCP) SERVICE DATA UNITS (PSDUS)

PRIORITY CLAIM

This application is a continuation of U.S. patent application Ser. No. 15/382,128, filed Dec. 16, 2016, now issued as U.S. Pat. No. 10,201,037, which claims priority under 35 USC 119(e) to U.S. Provisional Patent Application Ser. No. 62/291,697, filed on Feb. 5, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to spatial reuse signaling in the physical layer convergence procedure (PLCP) service data units (PSDUs).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

Thus, there are general needs for improved methods, apparatuses, and computer readable media for centralized channel access for primary and secondary channels.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
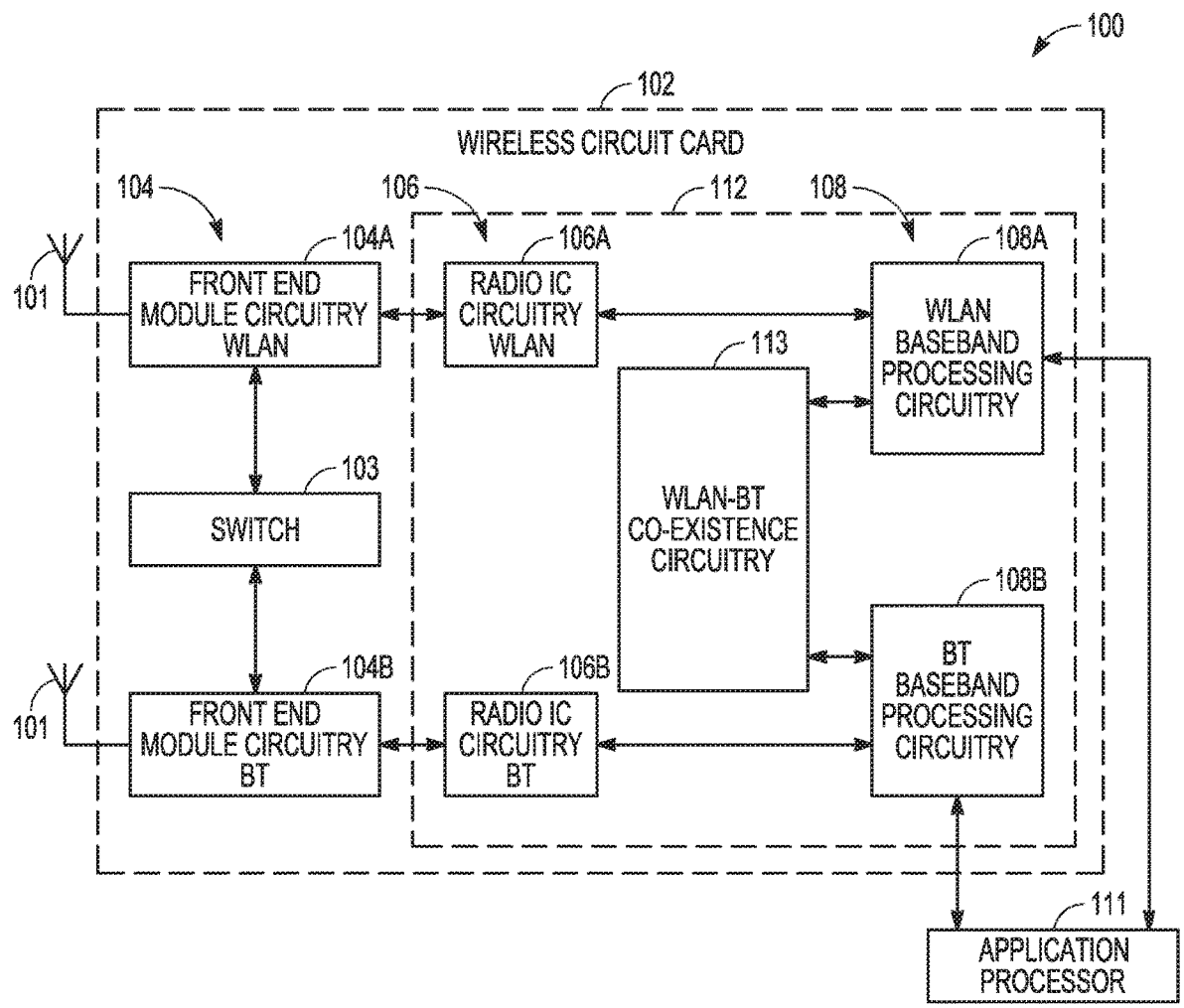
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 102, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11 ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
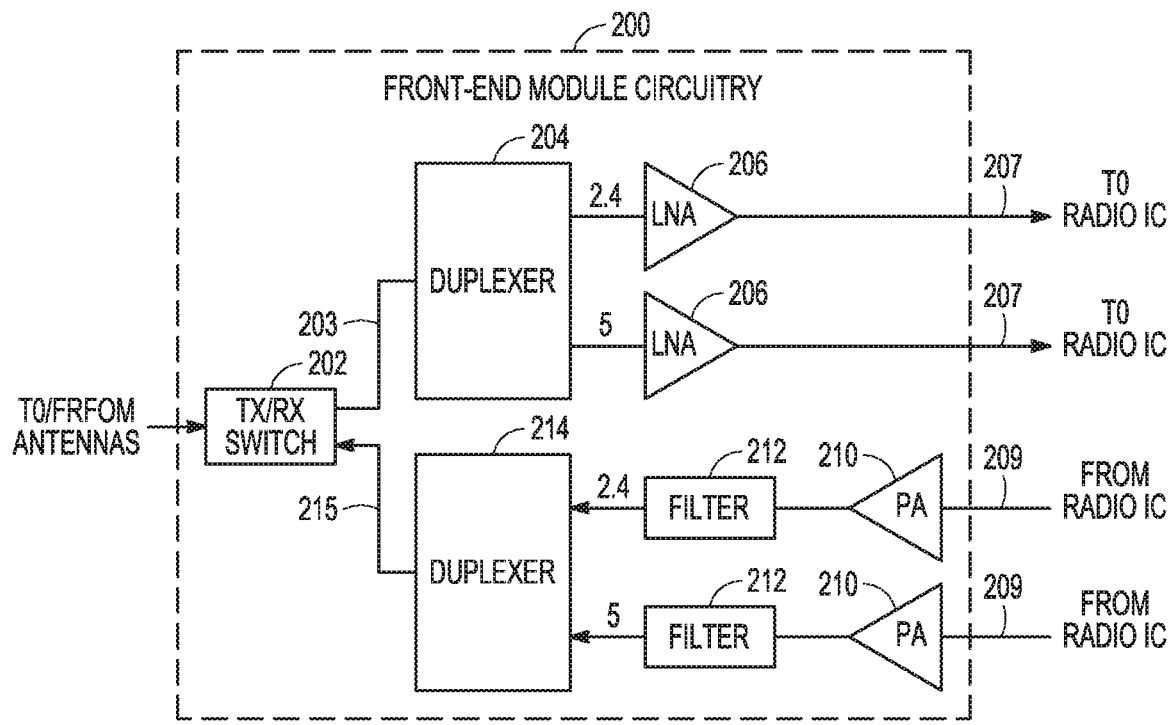
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
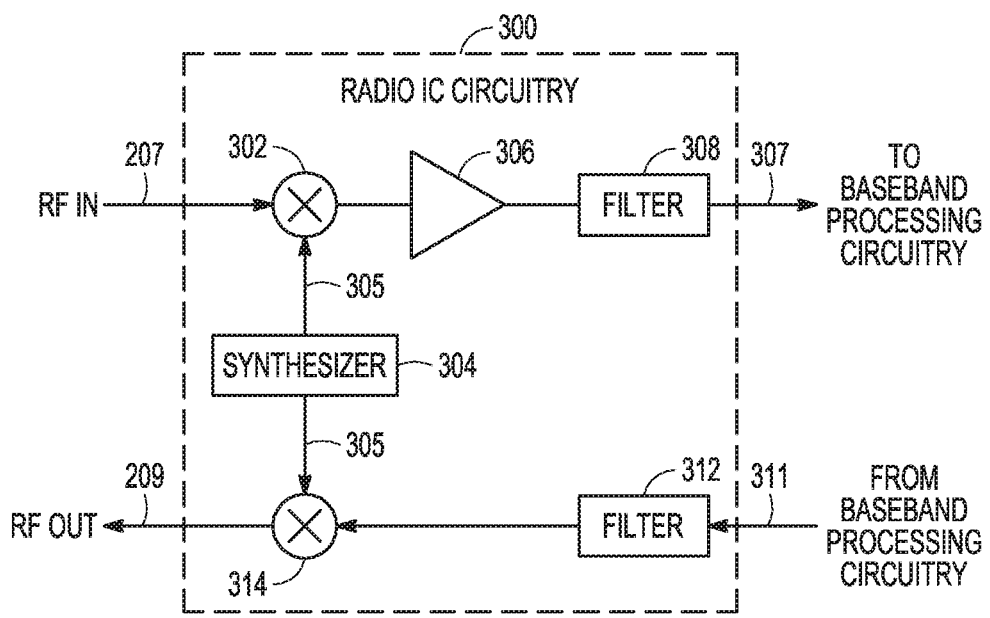
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
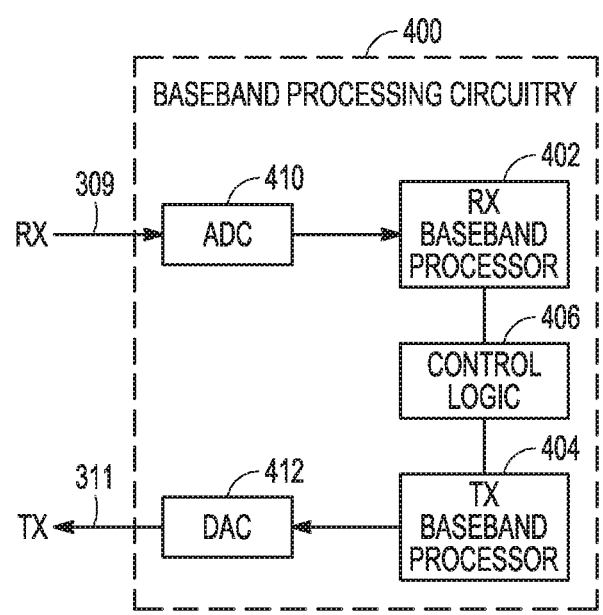
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
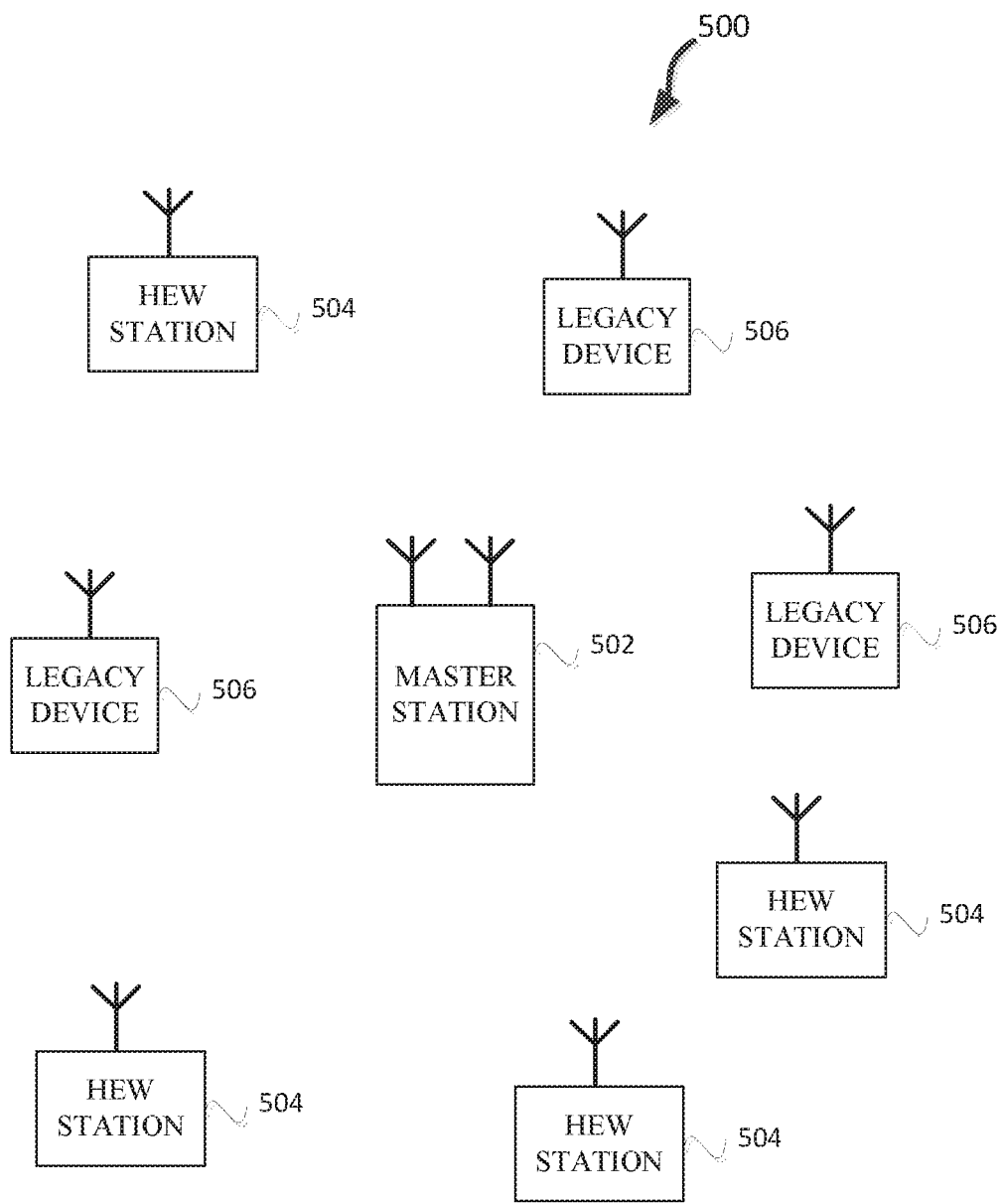
FIG. 5 illustrates a wireless network in accordance with some embodiments.

FIG. 5 illustrates a wireless local area network (WLAN) in accordance with some embodiments. The WLAN may comprise a basis service set (BSS) 500 that may include a master station 502, which may be an access point (AP), a plurality of high-efficiency wireless (HEW) (e.g., IEEE 802.11ax) STAs 504 and a plurality of legacy (e.g., IEEE 802.11n/ac) devices 506.

The master station 502 may be an AP using the IEEE 802.11 to transmit and receive. The master station 502 may be a base station. The master station 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 502 that is part of an extended service set (ESS). A controller may store information that is common to the more than one master stations 502.

The legacy devices 506 may operate in accordance with one or more of IEEE 802.11 a/b/g/n/ac/ad/af/ah/aj, or another legacy wireless communication standard. The legacy devices 506 may be STAs or IEEE STAs. The HEW STAs 504 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 504 may be termed high efficiency (HE) stations.

The master station 502 may communicate with legacy devices 506 in accordance with legacy IEEE 802.11 communication techniques. In example embodiments, the master station 502 may also be configured to communicate with HEW STAs 504 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 504, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 502, HEW STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 502 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 502 may transmit a HEW master-sync transmission, which may be a trigger frame or HEW control and schedule transmission, at the beginning of the HEW control period. The master station 502 may transmit a time duration of the TXOP and sub-channel information. During the HEW control period, HEW STAs 504 may communicate with the master station 502 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 502 may communicate with HEW stations 504 using one or more HEW frames. During the HEW control period, the HEW STAs 504 may operate on a sub-channel smaller than the operating range of the master station 502. During the HEW control period, legacy stations refrain from communicating.

In accordance with some embodiments, during the master-sync transmission the HEW STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 502 may also communicate with legacy stations 506 and/or HEW stations 504 in accordance with legacy IEEE 802.11 communication techniques. In some embodiments, the master station 502 may also be configurable to communicate with HEW stations 504 outside the HEW control period in accordance with legacy IEEE 802.11 communication techniques, although this is not a requirement.

In example embodiments, the HEW device 504 and/or the master station 502 are configured to perform the methods and functions herein described in conjunction with FIGS. 5-16.

Figure 6:
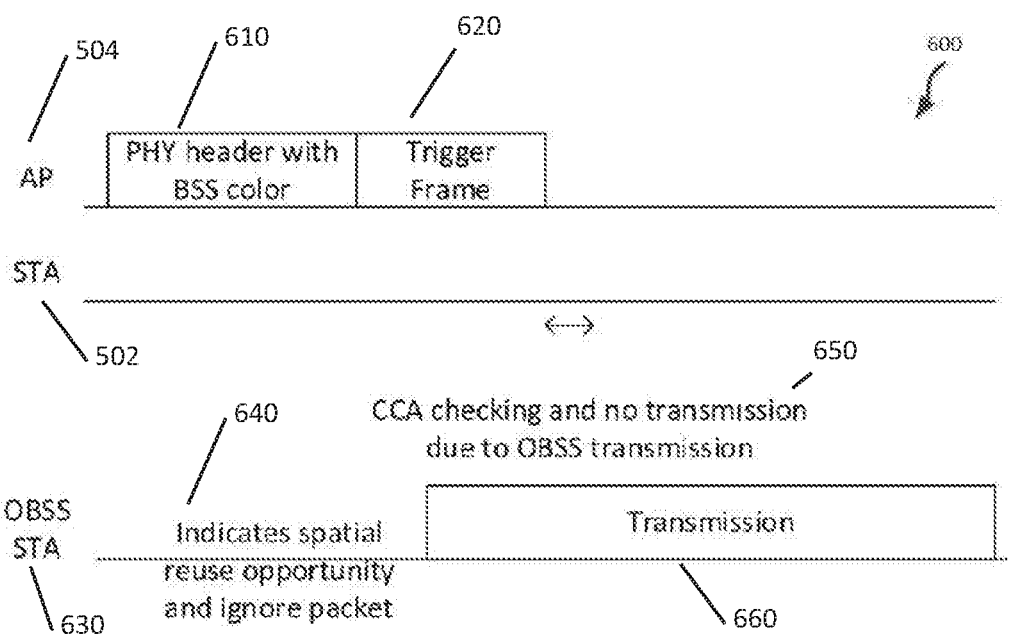
FIG. 6 depicts frame transmissions illustrating a station not being able to transmit due to an OBSS station transmission and CCA checking in accordance with some embodiments.

Some embodiments may have the problem that a spatial reuse operation may prevent an uplink (UL) multi-user (MU) transmissions due to the requirement of clear channel assessment (CCA) checking for a response to a trigger frame. FIG. 6 at 600 illustrates a station (STA) 502 not being able to transmit due to an OBSS STA 630 and CCA checking 650 in accordance with some embodiments. The AP 504 transmits a PHY header with BSS color 610 and Trigger Frame 620. STA 502 does not transmit due to CCA checking and due to OBSS STA 630 transmission 6460. This occurs as OBSS STA 630 notes indication of spatial reuse opportunity and ignores the packet 640.

In some embodiments, specific spatial reuse indications are used in the PHY header 610 such as HE PHY header to resolve the problem. In some embodiments, which may be in accordance with IEEE 802.11ax, spatial reuse operation may also be used in the MAC portion of the physical layer convergence procedure (PLCP) protocol data unit (PPDU), e.g. PSDU.

In some embodiments, the STA determines whether the detected frame is an inter-BSS or an intra-BSS frame by using BSS color or the MAC address in the MAC header. If the detected frame is an Inter-BSS frame, under some conditions, the STA uses an OBSS_PD level that is greater than the minimum receive sensitivity level.

Figure 7:
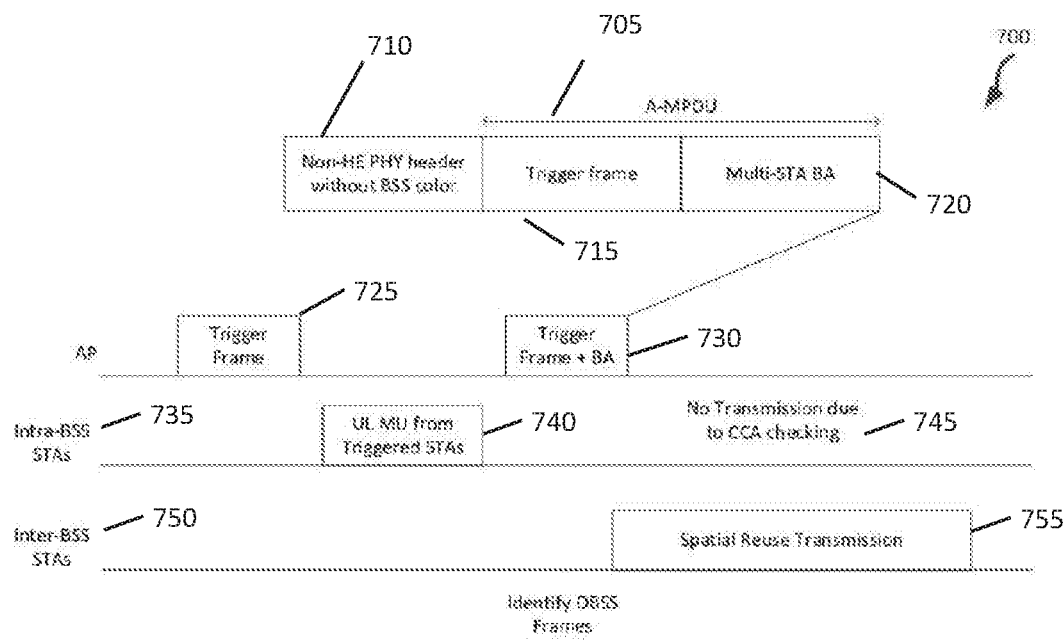
FIG. 7 illustrates an intra-BSS station not transmitting due to CCA checking in accordance with some embodiments.

FIG. 7 at 700 illustrates an intra-BSS station not transmitting due to CCA checking in accordance with some embodiments. When a trigger frame (TF) 725 is carried in non-HE format PPDU 710 such as non-HT PPDU, HT PPDU, or very high-throughput (VHT) PPDU, the TF may have a BSS identification (BSSID) in the transmitter address (TA) field of the MAC header. In some embodiments, a similar problem may occur especially when the Trigger Frame 715 is aggregated with other MPDUs (exemplified as a Multi-STA block acknowledgement (BA) 720) with a BSSID in the same aggregate (A)-MPDU 705. This transmission is shown at 730. In some embodiments Intra-BSS STAs 735, in response to Trigger Frame 725, may send uplink multi-user transmissions 740. A-MPDU 730 including Trigger Frame 715 and BA 720 transmissions may follow. In response, Inter-BSS STAs 750 may send a spatial reuse transmission 755 causing no transmissions due to CCA checking 745 by Intra-BSS STAs 735.

Figure 8:
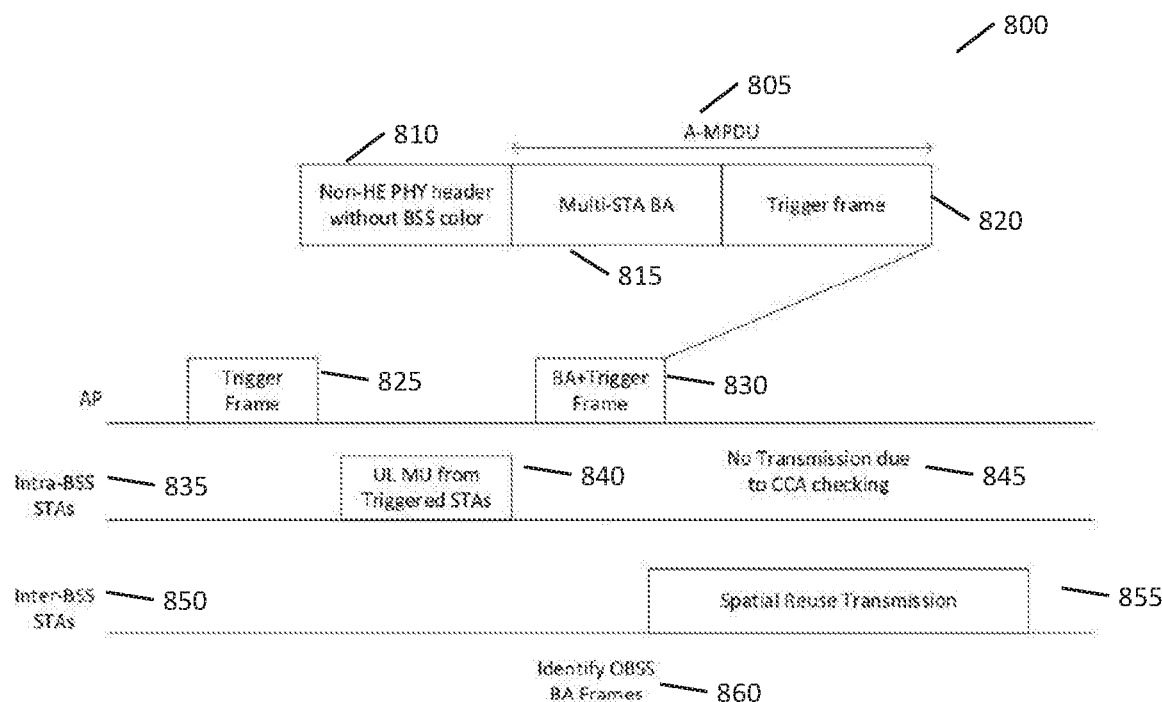
FIG. 8 illustrates an intra-BSS station not transmitting due to CCA checking in accordance with some embodiments.

FIG. 8 illustrates an intra-BSS station not transmitting due to CCA checking in accordance with some embodiments. When a Trigger Frame (TF) 825 is carried in non-HE format PPDU 810 such as non-HT PPDU, HT PPDU, or very high-throughput (VHT) PPDU, the Trigger Frame may have a BSS identification (BSSID) in the transmitter address (TA) field of the MAC header. In some embodiments, a similar problem may occur especially when the Trigger Frame 815 is aggregated with other MPDUs (exemplified as a Multi-STA block acknowledgement (BA) 820) with a BSSID in the same aggregate (A)-MPDU 805. This transmission is shown at 830 and it is noted that in FIG. 8, the Multi-STA BA 815 and Transmitter Frame 820 are aggregated such that the Multi-STA BA 815 is the first frame in A-MPDU 805 and Trigger Frame 820 is in the second frame. In some embodiments, Intra-BSS STAs 835 in response to Trigger Frame 825 may send uplink multi-user transmissions 840. A-MPDU 830 including Trigger Frame 815 and BA 820 transmissions may follow. In response, Inter-BSS STAs 850, identifying OBSS BA frames 860, may send a spatial reuse transmission 855 causing no transmissions due to CCA checking 845 by Intra-BSS STAs 835.

In some embodiments, there may also be a need for the transmitter to disable spatial reuse operation in the MAC portion of the PPDU, i.e., PSDU. For example, to disallow spatial reuse transmission on top of spatial reuse transmission or to protect current transmissions. Some embodiments herein may define specific rules to aggregate trigger frames in A-MPDU 805. For example, Trigger Frame 820 shall be the first frame in an A-MPDU 805 to avoid the case in FIG. 8 when there is no signaling in block acknowledgement (BA) 815. Some embodiments define specific spatial reuse restrictions. Some embodiments may not be required to have restrictions to accommodate a Trigger Frame carried in non-HE PPDU for the spatial reuse operation.

Figure 9:
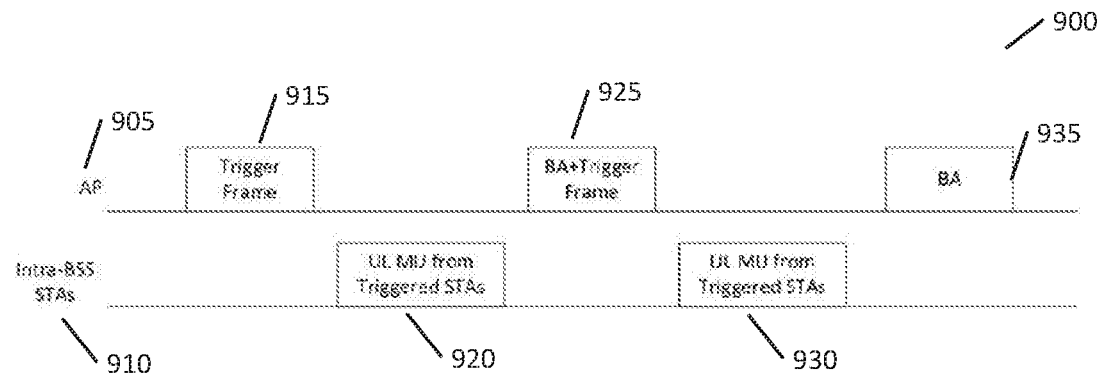
FIG. 9 illustrates the transmission opportunity illustrated in FIGS. 6-8 without an interfering spatial reuse operation in accordance with some embodiments.

FIG. 9 illustrates the transmission opportunity illustrated in FIGS. 6-8 without an interfering spatial reuse operation in accordance with some embodiments. This may be enabled by signaling in the MAC header that provides further indications or restrictions for spatial reuse. The further indication or restrictions may include disallowing spatial reuse. In some embodiments, AP 905 may transmit TF 915 and in response, Intra-BSS STAs 910 may send uplink (UL) multi-user (MU) transmission by triggered STAs. AP 905 may transmit BA+TF at 905 and in response Intra-BSS STAs may send uplink (UL) multi-user (MU) transmission by triggered STAs. AP 905 sends BA in response at 935.

In some embodiments there are indications in the MAC portion of the PPDU to indicate spatial reuse restrictions. This indication is useful when the PHY header does not have signaling to enable spatial reuse operation such as BSS color.

In some embodiments, one or more of the following may be used for signaling in the MAC portion of the PPDU to enable the indication. An embodiment herein may provide explicit signaling. In the common information of the Trigger Frame, specific bits may be used to indicate spatial reuse restriction. Common information of a Trigger Frame may include other spatial reuse information indicated in an HE-SIG-A such as one or more of the following: BSSID; margin for spatial reuse indication; CCA for spatial reuse indication; and, margin+transmit (TX) transmission power for spatial reuse indication.

Figure 10:
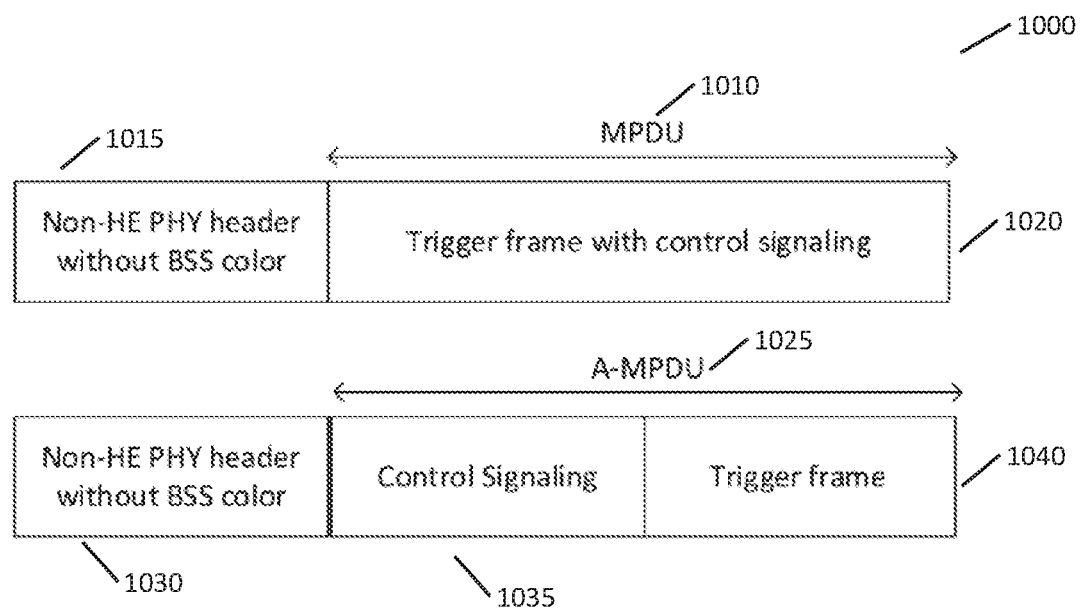
FIG. 10 illustrates spatial reuse control signaling in a different MAC protocol data unit (MPDU) in accordance with some embodiments.

An embodiment may provide specific control signaling be defined to carry the indication of spatial reuse restriction. In some embodiments, there is an HE variant of an HT control defined to carry control signaling. Some embodiments may define spatial reuse control signaling in an HE variant of an HT control to indicate spatial reuse restriction. Spatial reuse control signaling may be carried with a frame such as Trigger Frame in the same MPDU or in a separate MPDU as illustrated in FIG. 10. Spatial reuse control signaling may be carried with data frame/control frame/management frame for general spatial reuse purposes. The control signaling may be in a different MPDU, such as control/management/data frame from the TF as illustrated in FIG. 10, which illustrate non-HE PHY header without BSS color 1015 followed by MAC protocol data unit (MPDU) 1010 and TF with control signaling, shown generally as 1020. A non-HE PHY header without BSS color 1030 may be followed by A-MPDU 1025, which may aggregate control signaling 1035 and Trigger Frame 1040.

Spatial reuse control signaling may have other spatial reuse related information indicated in an HE-SIG-A, such as: BSSID; margin for spatial reuse indication; CCA for spatial reuse indication; and, margin+TX transmission power for spatial reuse indication.

For explicit signaling, several bits may be allocated for the signaling and several values for the allocated bits will be used for the signaling. An embodiment herein may also use implicit signaling. When the trigger frame is decoded, a specific spatial reuse restriction defined in a specification may be applied. This may only enable an indication for the restriction rather than multiple restrictions. In this embodiment, for every non-HE format PPDU, such as non-HT PPDU, HT PPDU, and VHT PPDU, spatial reuse is disallowed.

The indication of a spatial reuse restriction may include one or more of the following:

Option 1—spatial reuse operation is allowed at least after the end of the frame: (a) Additional inter-frame space (IFS) after the PPDU may be added for the requirement; (b) The duration of the HE PHY header for the response frame may be added as well; and, (c) The requirement may be met by letting the STA defer for the required duration before starting spatial reuse transmission.

Option 2—spatial reuse operation is limited by the duration of the current PPDU: (a) specifically, spatial reuse transmission may end before the end of the current PPDU; (b) This may be useful for protection of the possible following ACK transmission; (c) This may not be useful to prevent the problem of a Trigger Frame since Trigger Frame is short and is not generally integrated with other data in non-HE MU format (or DL MU format).

Option 3—spatial reuse operation is not limited. Specifically, special reuse transmission may not end before the end of the current PPDU.

Option 4—spatial reuse operation is not allowed. The signaling may be useful for other scenarios.

There may be conditions to set the restrictions such as disallow spatial reuse. A specific indication may only be set under conditions, in accordance with some embodiments. For example, spatial reuse restriction of option 1 and option 2 may be allowed only if a Trigger Frame is carried with the PPDU. For example, spatial reuse restriction of option 4 is allowed only if a spatial reuse transmission is on top of other spatial reuse transmissions.

Based on the signaling chosen for some embodiments, additional rules may need to be defined by one or more of the following: (1) a Trigger Frame may be the first MPDU in the aggregated A-MPDU; this may be useful when the signaling is only carried in the MPDU with a Trigger Frame and resolves the problem illustrated in FIG. 8; (2) a Trigger Frame shall not be aggregated in a A-MPDU with more than two MPDUs when the A-MPDU is not transmitted in a DL MU format; in some embodiments, if the signaling is only in the Trigger Frame, the Trigger Frame is the first MPDU. When the Inter-BSS STAs miss the Trigger Frame, they will decode the second MPDU, and spatial reuse operation cannot be applied before UL response to trigger frame.

In some embodiments, if the transmitter is going to have spatial reuse signaling in the PSDU, the spatial reuse signaling may be included in the first MPDU in the aggregated A-MPDU. If not, the Inter-BSS STAs may decode the first MPDU in the A-MPDU and ignore the following MPDUs with spatial reuse signaling. This can be applied when the signaling indicates spatial restrictions.

If the transmitter is going to have spatial reuse signaling in the MPDU of a PSDU, the spatial reuse signaling may be included in every MPDU in the aggregated A-MPDU. This can be applied when the signaling indicates spatial restrictions. Some embodiments prevent the error case that other STAs cannot decode the MPDU with spatial reuse signaling. Exceptions may be added for the last MPDU in accordance with some embodiments.

Figure 11:
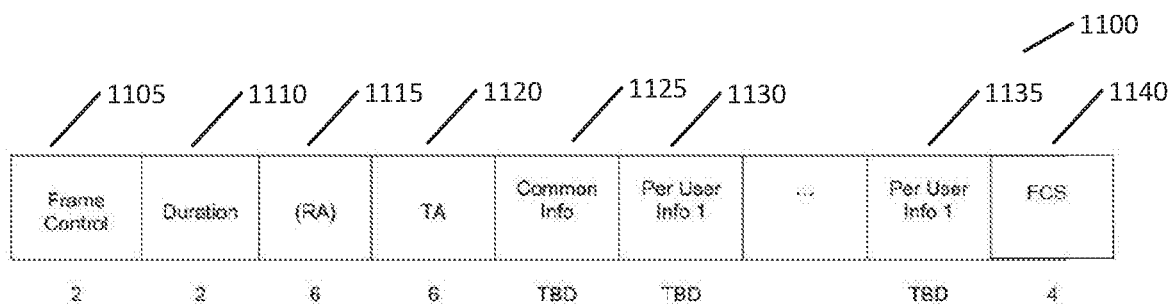
FIG. 11 illustrates a format for a trigger frame in accordance with some embodiments.

FIG. 11 illustrates a format for a trigger frame in accordance with some embodiments. The trigger frame may include frame control 1105, duration 1110, receiver address (RA) 1115, transmitter address (TA) 1120, common info 1125, per user info 1 1130, per user info 1 1135 and FCS 1140.

Figures 12, 13:
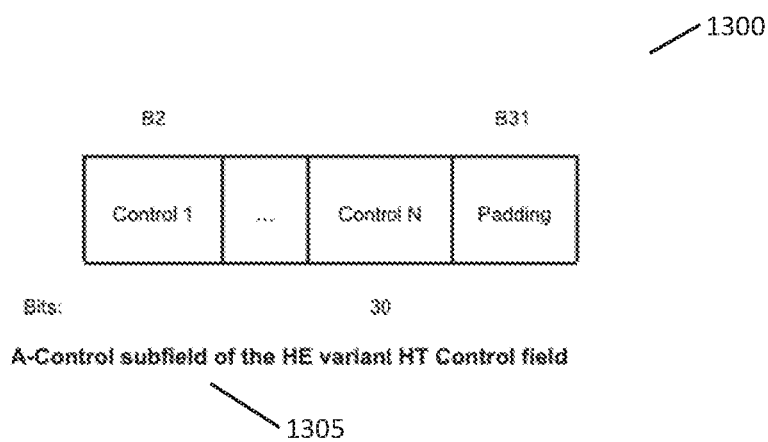
FIG. 12 illustrates the format of an HE variant of high-throughput (HT) control in accordance with some embodiments.
FIG. 13 illustrates a control subfield of the HE variant HT control field in accordance with some embodiments.

FIG. 12 shown generally as 1200, illustrates the format of an HT Control Field 1205 with HE variant of high-throughput (HT) control in accordance with some embodiments. The variants may include HT variant 1210, VHT variant 1215 and HE variant 1220.

Figure 14:
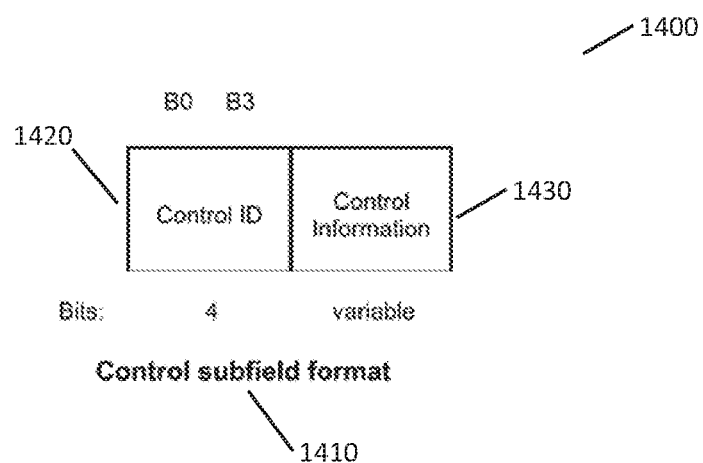
FIG. 14 illustrates a control subfield format in accordance with some embodiments.

FIG. 13 at 1300 illustrates a control subfield of the HE variant HT control field 1305 in accordance with some embodiments. FIG. 14 at 1400 illustrates a control subfield format 1410 with Control ID 1420 and Control Information 1430 in accordance with some embodiments.

Figure 15:
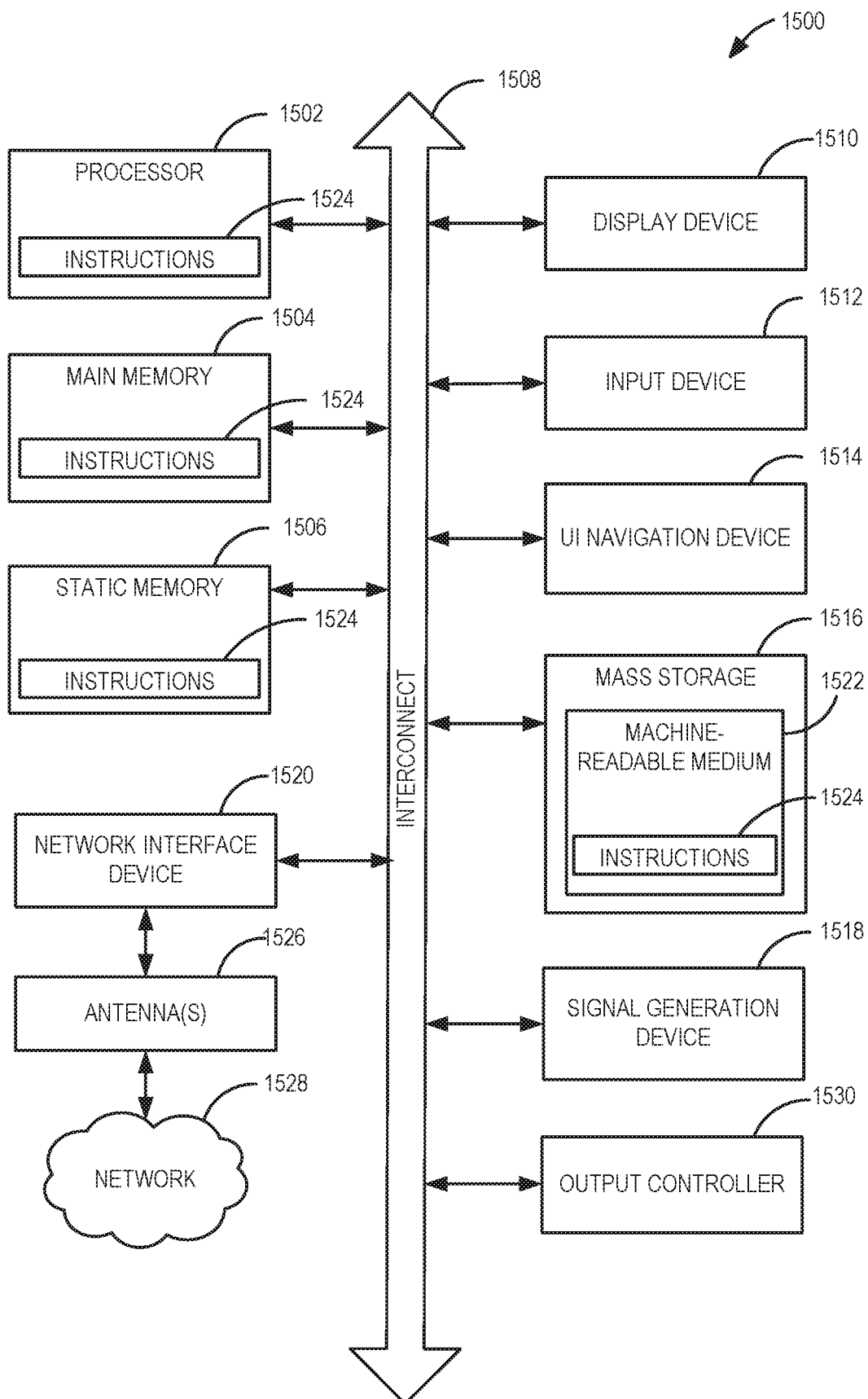
FIG. 15 illustrates a block diagram of an example machine upon which any one or more of the techniques (e.g., methodologies) discussed herein may perform.

FIG. 15 illustrates a block diagram of an example machine 1500 upon which any one or more of the techniques (e.g., methodologies) discussed herein may perform. The machine 1500 may incorporate all or some of the radio architecture illustrated in FIGS. 1-4. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a master station 502, HEW station 504, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1502 and/or instructions 1524 may comprise processing circuitry.

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine readable media.

While the machine readable medium 1522 is illustrated as a single medium, the term "machine readable medium" may include a single medium or multiple media (e.g., a centralized or distributed database, and/or associated caches and servers) configured to store the one or more instructions 1524.

Figure 16:
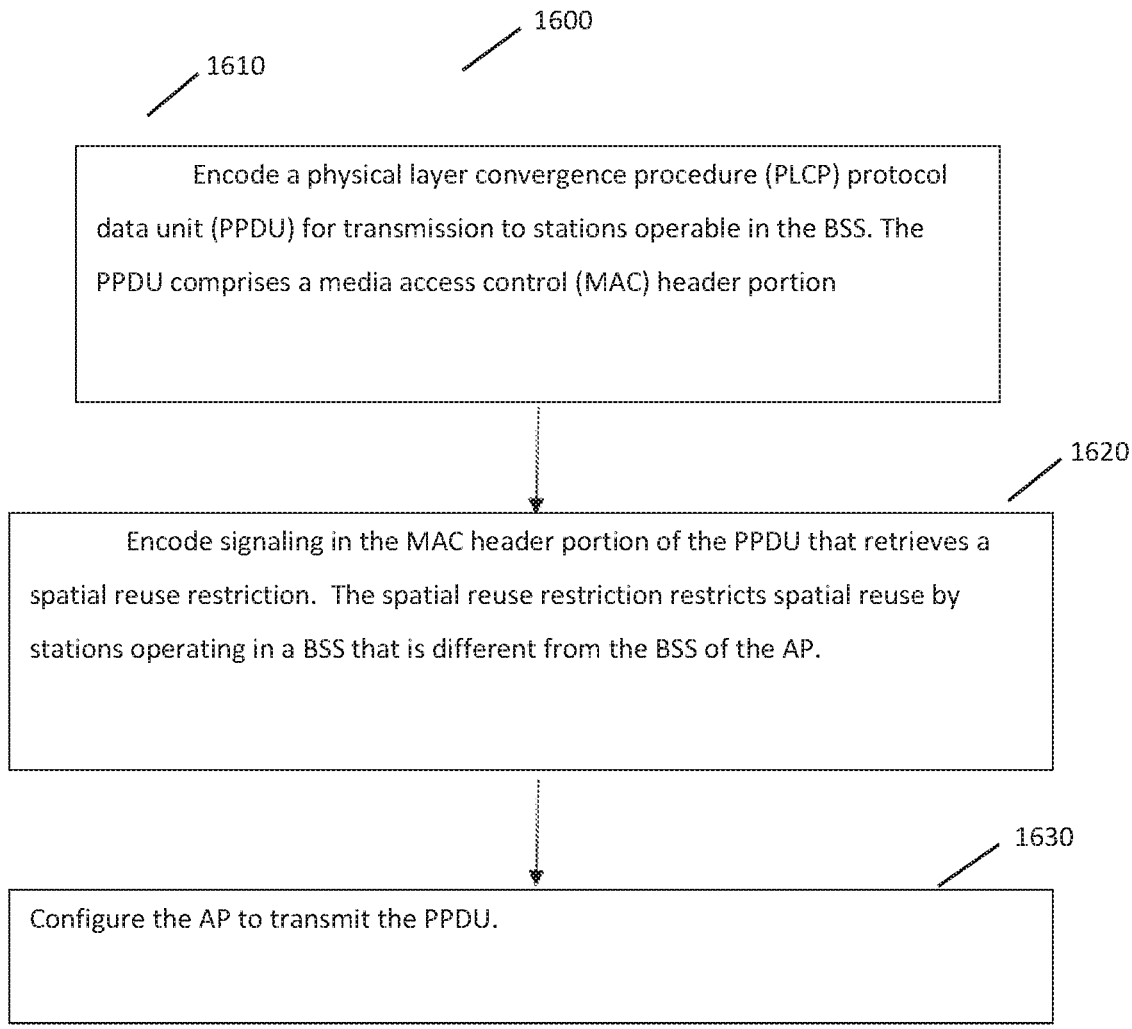
FIG. 16 illustrates a method in accordance with some embodiments.

FIG. 16 at 1600 illustrates a method in accordance with some embodiments. At 1610 an embodiment may encode a physical layer convergence procedure (PLCP) protocol data unit (PPDU) for transmission to stations operable in the BSS. The PPDU may comprise a media access control (MAC) header portion. In some embodiments at 1620, an embodiment may encode signaling in the MAC header portion of the PPDU that indicates a spatial reuse restriction. The spatial reuse restriction restricts spatial reuse by stations operating in a BSS that is different from the BSS of the AP. At 1630 an embodiment may configure the AP to transmit the PPDU.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. In some examples, the network interface device 1520 may wirelessly communicate using Multiple User MIMO techniques. The term "transmission medium" shall be taken to include any intangible medium that is capable of storing, encoding or carrying instructions for execution by the machine 1500, and includes digital or analog communications signals or other intangible medium to facilitate communication of such software.

In Example 1, an apparatus of an access point (AP), configurable to operate in a basic service set (BSS). The apparatus may comprise memory and processing circuitry coupled to the memory, the processing circuitry configured to encode a physical layer convergence procedure (PLCP) protocol data unit (PPDU) for transmission to stations operable in the BSS, wherein the PPDU comprises a media access control (MAC) header portion. The processing circuitry may further encode signaling in the MAC header portion of the PPDU that indicate a spatial reuse restriction, wherein the spatial reuse restriction restricts spatial reuse by stations operating in a BSS that is different from the BSS of the AP, and configure the AP to transmit the PPDU.

In Example 2, the subject matter of Example 1, further comprising encoding the spatial reuse restriction in an HE-A control field of the MAC header portion.

In Example 3, the subject matter of one or any combination of Examples 1-2, wherein the signal for spatial reuse restriction includes a restriction that for every non-HE format PPDU, spatial reuse is disallowed.

In Example 4, the subject matter of one or any combination of Examples 1-3, wherein the signal for spatial reuse restriction includes an implicit signal wherein a specific spatial reuse restriction is defined in a specification.

In Example 5, the subject matter of one or any combination of Examples 1-4, wherein the signal for spatial reuse restriction includes a spatial reuse operation is allowed at least after the end of the PPDU and is not allowed during the duration of the PPDU.

In Example 6, the subject matter of one or any combination of Examples 1-5, wherein the signal for spatial reuse restriction includes the spatial reuse operation is limited by a duration of the current PPDU.

In Example 7, the subject matter of one or any combination of Examples 1-6, wherein the signal for spatial reuse restriction includes spatial reuse operation is not limited.

In Example 8, the subject matter of one or any combination of Examples 1-7, wherein the signal for spatial reuse restriction includes spatial reuse operation is not allowed.

In Example 9, wherein the signal for spatial reuse restriction is carried in an MPDU if a PPDU that carries the MPDU includes a Trigger Frame (TF).

In Example 10, wherein the processing circuitry is further configured to encode restrictions on aggregating the TF with another MPDU.

In Example 11, the subject matter of one or any combination of Examples 1-10, wherein the restrictions on the A-MPDU aggregation are the TF be a first frame in the A-MPDU.

In Example 12, the subject matter of one or any combination of Examples 1-11, wherein the processing circuitry encodes spatial reuse signaling in every MPDU in the A-MPDU.

In Example 13, the subject matter of one or any combination of Examples 1-12, wherein the signaling in the MAC header is explicit signaling with specific bits in a common information (Common Info) Field of the TF to indicate the restrictions on spatial reuse.

In Example 14, the subject matter of one or any combination of Examples 1-13, wherein the Common Info Field of the TF is in a HE-SIG-A frame that comprises one or more of the following group: a basic service set (BSS) identification (ID) (BSSID) of a BSS of the access point; a margin for spatial reuse; a clear channel assessment for spatial reuse indication; and, an indication of a transmit power for spatial reuse.

In Example 15, the subject matter of one or any combination of Examples 1-14, wherein the spatial reuse restriction in the HE-A control field of the MAC header portion comprises one or more of the following group: a basic service set (BSS) identification (ID) (BSSID) of a BSS of the access point; a margin for spatial reuse; a clear channel assessment for spatial reuse indication; and, an indication of a transmit power for spatial reuse.

In Example 16, the subject matter of one or any combination of Examples 1-15, wherein the restrictions on spatial reuse comprises one or more of the following group: spatial reuse operation is allowed after an end of the PPDU; spatial reuse operation is limited by the duration of the PPDU; spatial reuse operation is not limited; and spatial reuse operation is not allowed.

In Example 17, the subject matter of one or any combination of Examples 1-16, wherein the access point is one from the following group: an Institute of Electrical and Electronic Engineers (IEEE) 802.11ax AP and an IEEE 802.11 AP.

In Example 18, the subject matter of one or any combination of Examples 1-17, wherein the processing circuitry includes a baseband processor to encode the non-HE PPDU.

In Example 19, the subject matter of one or any combination of Examples 1-18, further comprising one or more antennas coupled to the processing circuitry.

In Example 20, a non-transitory computer-readable storage medium that stores instructions for execution by one or more processors to perform operations by an access point (AP) to communicate in a basic service set (BSS). The operations to configure the one or more processors to encode a physical layer convergence procedure (PLCP) protocol data unit (PPDU) for transmission to stations operable in the BSS, wherein the PPDU comprises a media access control (MAC) header portion. The operations further may configure the one or more processors to encode signaling in the MAC header portion of the PPDU that indicate a spatial reuse restriction, wherein the spatial reuse restriction restricts spatial reuse by stations operating in a BSS that is different from the BSS of the AP, and configure the AP to transmit the PPDU.

In Example 21, the subject matter of Example 20, wherein the instructions further configure the processor to encode the spatial reuse restriction in an HE-A control field of the MAC header portion.

In Example 22, the subject matter of one or any combination of Examples 1-21, wherein the signal for spatial reuse restriction includes a restriction that is selected from one or more of the following group: an implicit signal wherein a specific spatial reuse restriction is defined in a specification; the signal for spatial reuse restriction includes a spatial reuse operation is allowed at least after the end of a frame; the signal for spatial reuse restriction includes the spatial reuse operation is limited by a duration of a current PPDU; the signal for spatial reuse restriction includes spatial reuse operation is not limited; and the signal for spatial reuse restriction includes spatial reuse operation is not allowed.

In Example 23, the subject matter of one or any combination of Examples 1-22, wherein the signal for spatial reuse restriction is carried in an MPDU if a PPDU that carries the MPDU includes a Trigger Frame (TF).

In Example 24, the subject matter of one or any combination of Examples 1-21, wherein the instructions further configure the processor to encode restrictions on aggregating the TF with another MPDU.

In Example 25, the subject matter of one or any combination of Examples 1-24, wherein the instructions further configure the processor to encode the TF to be a first frame in an aggregated MPDU (A-MPDU).

In Example 26, the subject matter of one or any combination of Examples 1-25, wherein the processing circuitry encodes spatial reuse signaling in every MPDU in the A-MPDU.

In Example 27, a method of communication by an access point (AP) operable in basic service set (BSS), comprising encoding a physical layer convergence procedure (PLCP) protocol data unit (PPDU) for transmission to stations operable in the BSS, wherein the PPDU comprises a media access control (MAC) header portion. The method further comprises encoding signaling in the MAC header portion of the PPDU that indicate a spatial reuse restriction, wherein the spatial reuse restriction restricts spatial reuse by stations operating in a BSS that is different from the BSS of the AP, and configuring the AP to transmit the PPDU.

In Example 28, the subject matter of claim 27, further comprising encoding the spatial reuse restriction in an HE-A control field of the MAC header portion.

In Example 29, the subject matter of one or any combination of Examples 1-28, wherein the spatial reuse restriction includes a restriction that is selected from one or more of the following group an implicit signal wherein a specific spatial reuse restriction is defined in a specification; the signal for spatial reuse restriction includes a spatial reuse operation is allowed at least after the end of a frame; the signal for spatial reuse restriction includes the spatial reuse operation is limited by a duration of a current PPDU; the signal for spatial reuse restriction includes spatial reuse operation is not limited; the signal for spatial reuse restriction includes spatial reuse operation is not allowed.

In Example 30, the subject matter of one or any combination of Examples 1-29, wherein the signal for spatial reuse restriction is carried in an MPDU if a PPDU that carries the MPDU includes a Trigger Frame (TF).

In Example 31, the subject matter of one or any combination of Examples 1-30, wherein the instructions further configure the processor to encode restrictions on aggregating the TF with another MPDU.

In Example 32, an apparatus of station (STA), operable in an overlapping basic service set (OBSS) of a basic service set (BSS) of an access point (AP), the apparatus comprising memory and processing circuitry coupled to the memory, the processing circuitry configured to decode a physical layer convergence procedure (PLCP) protocol data unit (PPDU) transmission from the AP, wherein the PPDU comprises a media access control (MAC) header portion. The processing circuitry may further be configured to decode signaling in the MAC header portion of the PPDU that indicate a spatial reuse restriction, wherein the spatial reuse restriction restricts spatial reuse by stations operating in a BSS that is different from the BSS of the AP, and configure the STA to operate according to the restrictions on spatial reuse.

In Example 33, the subject matter of Example 32, wherein the processing circuitry is further configured to decode the spatial reuse restriction from the HE-A control field of the MAC header portion.

In Example 34, the subject matter of one or any combination of Examples 1-33, wherein the restrictions on spatial reuse comprises one or more of the following group: spatial reuse operation is allowed after an end of the non HE PPDU; spatial reuse operation is limited by a duration of the non-HE PPDU; spatial reuse operation is not limited; and spatial reuse operation is not allowed.

In Example 35, the subject matter of one or any combination of Examples 1-34, wherein the processing circuitry includes a baseband processor to decode the PPDU.

What is claimed is:

1. An apparatus of a high-efficiency (HE) access point (AP), the apparatus configured to operate in a basic service set (BSS), and the apparatus comprising: memory; and, processing circuitry coupled to the memory, the processing circuitry configured to:
encode a physical layer convergence procedure (PLCP) protocol data unit (PPDU), the PPDU comprising a media access control (MAC) portion, the MAC portion comprising a trigger frame;
encode the trigger frame to indicate a spatial reuse restriction, wherein the spatial reuse restriction indicates a restriction on spatial reuse transmissions by inter-BSS HE stations, wherein if the spatial reuse restriction indicates that spatial reuse is allowed, the spatial reuse restriction indicates a value corresponding to a transmission power threshold of spatial reuse transmissions by the inter-BSS HE stations; and
generate signaling to cause the HE AP to transmit the PPDU.

2. The apparatus of claim 1, wherein the processing circuitry is further configured to:
encode the PPDU to further comprise a first aggregated MAC protocol data unit (A-MPDU) comprising the trigger frame and a second A-MPDU comprising another frame.

3. The apparatus of claim 1, wherein the processing circuitry is further configured to:
encode the PPDU to comprise a HE signal A (HE-SIG-A) field, the HE-SIG-A field comprising a color field indicating the color of the BSS the RE AP is configured to operate in.

4. The apparatus of claim 3, wherein the processing circuitry is further configured to:
encode the HE-SIG-A field to comprise an indication that the spatial reuse transmissions by the HE stations operating in the inter-BSS are limited to a duration of the transmission of the PPDU.

5. The apparatus of claim 1, wherein the processing circuitry is further configured to:
encode the trigger frame to identify HE STAs operating in the BSS to participate in uplink (UL) multiple user (MU) transmissions.

6. The apparatus of claim 5, wherein the processing circuitry is further configured to:
encode the trigger frame to comprise a resource unit for each HE STA identified in the trigger frame.

7. The apparatus of claim 5, wherein the trigger frame comprises a common information field and a plurality of fields that identify the HE STAs operating in the BSS, and wherein the common information field indicates spatial reuse restriction.

8. The apparatus of claim 1, wherein the processing circuitry is further configured to:
encode the PPDU as one of the following group: a HE MU PPDU, a non-high-throughput (HT) PPDU, a HT PPDU, and a VHT PPDU.

9. The apparatus of claim 1, wherein the processing circuitry is further configured to:
encode the PPDU as one of the non-HT, the HT PPDU, or the VHT PPDU to indicate that spatial reuse is disallowed during the transmission of the PPDU.

10. The apparatus of claim 1, wherein the processing circuitry is further configured to:
encode the PPDU to comprise a HE signal A (HE-SIG-A) field, the HE-SIG-A field comprising a second spatial reuse restriction, wherein the second spatial reuse restriction restricts spatial reuse by the inter-BSS HE stations, wherein the second spatial reuse restriction indicates whether spatial reuse is allowed during the transmission of the PPDU.

11. The apparatus of claim 1, wherein the processing circuitry is further configured to:
encode the spatial reuse restriction to indicate that spatial reuse is disallowed during the transmission of the PPDU and an inter-frame space (IFS) after the transmission of the PPDU.

12. The apparatus of claim 1, further comprising a direct conversion mixer, the direct conversion mixer configured to directly downconvert radio-frequency (RF) signals to baseband signals,
wherein the processing circuitry is configured to decode the baseband signals, the baseband signals including the PPDU.

13. The apparatus of claim 1, further comprising a super-heterodyne mixer, the super-heterodyne mixer configured to downconvert radio-frequency (RF) signals to intermediate frequency signals prior to generation of baseband signals, wherein the processing circuitry is configured to decode the baseband signals, the baseband signals including the PPDU.

14. The apparatus of claim 1, further comprising transceiver circuitry coupled to the processing circuitry, the transceiver circuitry coupled to two or more patch antennas for receiving signalling in accordance with a multiple-input multiple-output (MIMO) technique.

15. The apparatus of claim 1, further comprising transceiver circuitry coupled to the processing circuitry, the transceiver circuitry coupled to two or more microstrip antennas for receiving signalling in accordance with a multiple-input multiple-output (MIMO) technique.

16. The apparatus of claim 1, wherein the RE AP is configured to operate in accordance with at least one from the following group: Institute of Electrical and Electronic Engineers (IEEE) 802.11ax and IEEE 802.11.

17. A method performed by an apparatus of a high-efficiency (HE) access point (AP), the apparatus configured to operate in a basic service set (BSS), the method comprising:
 encoding a physical layer convergence procedure (PLCP) protocol data unit (PPDU), the PPDU comprising a media access control (MAC) portion, the MAC portion comprising a trigger frame;
 encoding the trigger frame to indicate a spatial reuse restriction, wherein the spatial reuse restriction indicates a restriction on spatial reuse transmissions by inter-BSS HE stations, wherein if the spatial reuse restriction indicates that spatial reuse is allowed, the spatial reuse restriction indicates a value corresponding to a transmission power threshold of spatial reuse transmissions by the inter-BSS HE stations; and
 generating signaling to cause the HE AP to transmit the PPDU.

18. The method of claim 17, the method further comprising:
 encoding the PPDU to further comprise a first aggregated MAC protocol data unit (A-MPDU) comprising the trigger frame and a second A-MPDU comprising another frame.

19. A non-transitory computer-readable storage medium that stores instructions for execution by one or more processors of an apparatus of a high-efficiency (HE) access point (AP), the apparatus configured to operate in a basic service set (BSS) and the instructions to configure the one or more processors to:
 encode a physical layer convergence procedure (PLCP) protocol data unit (PPDU), the PPDU comprising a media access control (MAC) portion, the MAC portion comprising a trigger frame;
 encode the trigger frame to indicate a spatial reuse restriction, wherein the spatial reuse restriction indicates a restriction on spatial reuse transmissions by inter-BSS HE stations, wherein if the spatial reuse restriction indicates that spatial reuse is allowed, the spatial reuse restriction indicates a value corresponding to a transmission power threshold of spatial reuse transmissions by the inter-BSS HE stations; and
 generate signaling to cause the HE AP to transmit the PPDU.

20. The non-transitory computer-readable storage medium of claim 19, wherein the instructions further configure the one or more processors to:
 encode the PPDU to further comprise a first aggregated MAC protocol data unit (A-MPDU) comprising the trigger frame and a second A-MPDU comprising another frame.

\* \* \* \* \*

UNITED STATES PATENT AND TRADEMARK OFFICE
CERTIFICATE OF CORRECTION

PATENT NO. : 10,750,571 B2
APPLICATION NO. : 16/218208
DATED : August 18, 2020
INVENTOR(S) : Huang et al.

Page 1 of 1

It is certified that error appears in the above-identified patent and that said Letters Patent is hereby corrected as shown below:

In the Claims

Column 20, Line 9, Claim 3, delete "RE" and insert --HE-- therefor

Column 21, Line 14, Claim 16, delete "RE" and insert --HE-- therefor

Signed and Sealed this
Twelfth Day of January, 2021

Andrei Iancu
*Director of the United States Patent and Trademark Office*